United States Patent [19]

Spodig

[11] 4,137,174

[45] Jan. 30, 1979

[54] PERMANENT MAGNETIC SEPARATOR FOR LIQUIDS

[76] Inventor: Heinrich Spodig, 4714 Selm-Bork, Netteberge 202, Fed. Rep. of Germany

[21] Appl. No.: 821,633

[22] Filed: Aug. 4, 1977

[30] Foreign Application Priority Data

Aug. 10, 1976 [DE] Fed. Rep. of Germany ....... 2635858

[51] Int. Cl.² .............................................. B01D 35/06
[52] U.S. Cl. ................................. 210/222; 209/223 R; 209/222; 210/322
[58] Field of Search ....................... 210/222, 223, 322; 209/221, 222, 223 R, 224, 228, 231, 232

[56] References Cited

U.S. PATENT DOCUMENTS

| 2,717,080 | 9/1955 | Anderson | 210/222 |
| 2,729,333 | 1/1956 | Garde et al. | 210/222 |
| 2,876,902 | 3/1959 | Varekamp | 210/223 |
| 3,341,021 | 9/1967 | Casson | 210/222 |
| 3,439,808 | 4/1969 | Sommermeyer | 210/222 |
| 3,481,471 | 12/1969 | Spody | 210/222 |

Primary Examiner—Theodore A. Granger
Attorney, Agent, or Firm—Wallenstein, Spangenberg, Hattis & Strampel

[57] ABSTRACT

Permanent magnetic separators for liquids to be purified which comprise one or more ferromagnetic catch and discharge bodies for the impurities contained in the liquid, which impurities are removed by means of at least one stripper from the effective adhesive surface, wherein said catch and discharge body or bodies is polarized from the outside, said catch and discharge body or bodies consisting of two bowl-shaped rotary bodies placed opposite each other and separated by an operating gap, and at least one of said catch and discharge bodies is positioned rotatably between two pole shoes placed opposite each other of at least one magnetic yoke. Additional features and particular embodiments include, among others, juxtaposed pairs of the catch and discharge bodies and switching units for effecting shorting of the magnetic lines of force.

18 Claims, 13 Drawing Figures

PERMANENT MAGNETIC SEPARATOR FOR LIQUIDS

This invention relates to improvements in permanent magnetic separators for liquids. It is especially concerned with such separators of the type which comprise a ferromagnetic catch and discharge body for the impurities contained in the liquid, which impurities are removed by means of a stripper from the effective adhesive surface. The catch and discharge bodies of such separators as are known to the prior art are of roller-like design, with the rollers being arranged in a box-like flow-through housing and wherein the rollers are polarized from the outside by accommodating the magnets between housing and roller and/or in the roller and by connecting them with one one pole via the shaft of the roller to the housing. However, only a limited space is available in the arrangement of the magnets, so that limits are imposed upon the magnetizability. In accordance with the present invention, the stray fields which are present in the separators of the prior art are essentially eliminated and the effectiveness of the magnetic separators is substantially improved.

In accordance with the present invention, the catch and discharge body is made of two bowl-shaped rotary bodies placed opposite each other and separated by an operating gap, and at least one discharge and catch body is positioned rotatably between two pole shoes placed opposite each other of at least one magnetic yoke. The rotatable arrangement of bowl-like catch and discharge bodies in magnetic yokes enables the utilization of a major number of magnetic yokes, as a result of which the magnetic adhesive force at the catch and discharge bodies in increased dramatically by the formation of a homogeneously magnetic operating gap which considerably improves the effectiveness.

Additional details, applications and advantages of the invention are explained below more in detail by means of the particularly preferred embodiments represented in the drawings in which.

Figure 1:
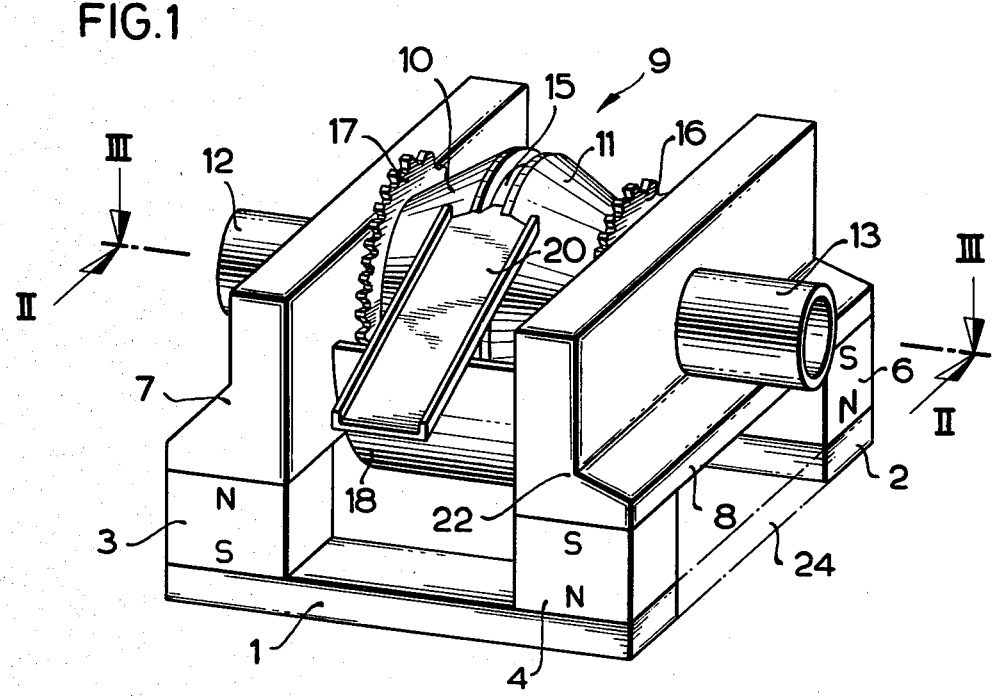
FIG. 1 is a schematic view of one embodiment of the separator.
Figure 2:
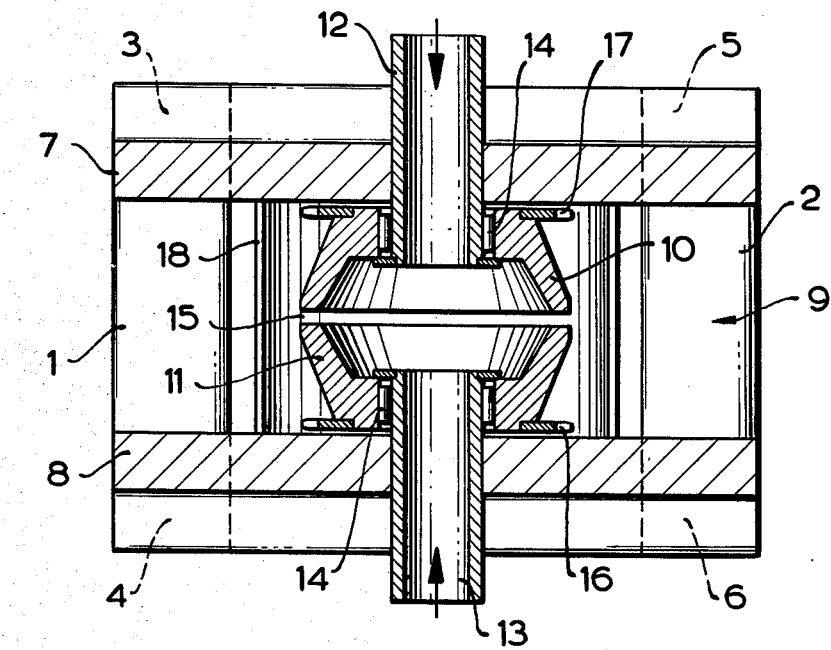
FIG. 2 is a horizontal section through the separator along line II—II of FIG. 1, looking in the direction of the arrows.

Referring first primarily to FIG. 1, the separator comprises two magnetic yokes which in each case are formed by the ferromagnetic bars 1, 2 and the block shaped permanent magnets 3, 4, 5 (not shown) and 6, arranged thereon with opposite magnetic poles, and the pole shoes 7, 8, connecting the yokes to form a magnetic system. The bars 1, 2 short the unidentical poles of the permanent magnets 3, 4, 5, 6, magnetically, while the opposite other poles of the permanent magnets 3, 4, 5, 6, polarize the poles shoes 7, 8, in an opposite manner, so that in the space or interstice 9, between the pole shoes 7, 8, a powerful homogeneous magnetic field of lines of force is produced. For practical utilization of this field of lines of force, a catch and discharge body, comprising the bowl-shaped rotary bodies 10, 11 placed opposite each other, is positioned rotatably on hollow shafts or tubes 12, 13 arranged fixedly in the pole shoes, by means of ball bearings 14 or the like (See FIGS. 2 and 3). The rotary bodies 10, 11, made from material conductive to magnets, for example iron or steel, include between them an annular gap 15 which functions as a magnetic operating gap, whereby in said operating gap 15 a powerful homogeneous magnetic field forms originating from the edges of the rotary bodies 10, 11. The rotation of the bowl-shaped rotary bodies 10, 11 is accomplished via any suitable drive means (not shown) which transmits its torque to the gear-like members or serrated crowns 16, 17 attached to the rotary bodies 10, 11.

The actual separation process progresses in the following manner: The liquid to be separated enters in opposite directions of flow through the tubes 12, 13, which liquid may contain or consist of magnetizable, with or without non-magnetizable, material, and passes into the interior of the bodies 10, 11 and flows out preponderantly through the operating gap 15 located below the tube axis, down into a container 18 located therebelow and from there into the discharge 19 (see FIG. 3). As the liquid passes through the operating gap 15, it is exposed to the powerful magnetic field. As a result, the ferromagnetic impurities remain in adhering relation to the edges of the discs 10, 11 and in the operating gap 15 and at the same time they build up so homogeneously in a bridge-like manner between the rotary bodies 10, 11 that even the impurities which are not magnetic are collected from the liquid to be separated. A stripper 20, which engages in the area of essentially the highest point of the rotary bodies 10, 11 into the operating gap 15 and continuously cleans the latter and the edges during the rotation of the rotary bodies 10, 11, is used for the separation of the collected impurities.

The rotary bodies 10, 11 also may be magnetized by a magnetic yoke, depending on what magnetic force is required for the liquid to be separated in any particular case. The modification involving the utilization of a magnetic yoke is readily achieved simply by the reduction of the magnets 3, 4, 5, 6 shown in FIG. 1 to a magnetic pair 3, 4, or 5, 6. Then the rotary bodies 10, 11 are appropriately relocated or positioned directly or substantially directly above the pairs of magnets 3, 4 or 5, 6, or in their immediate or operative range.

Figure 4:
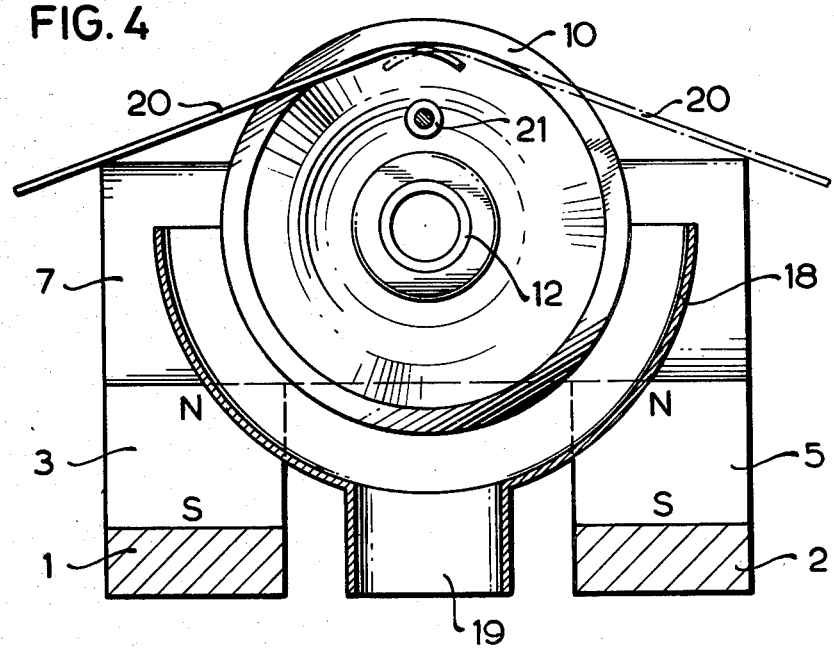
FIG. 4 is a vertical section through the separator along line IV—IV of FIG. 3, looking in the direction of the arrows.

While, as shown and described above, the rotary bodies 10, 11 are rotated in the same direction, said rotary bodies 10, 11 can be arranged to rotate in opposite directions in relation to each other. In such cases, bridge-like bodies which build up in the operating air gap 15 loosen up and assure a continuous discharge of the purified liquid. The constructions in which opposite directions of rotation of the rotary bodies 10, 11 are embodied require each of said rotary bodies to have its own drive and stripper 20, which are arranged opposite each other, as shown, for example, in FIG. 4 in the presentation by broken lines.

Figure 3:
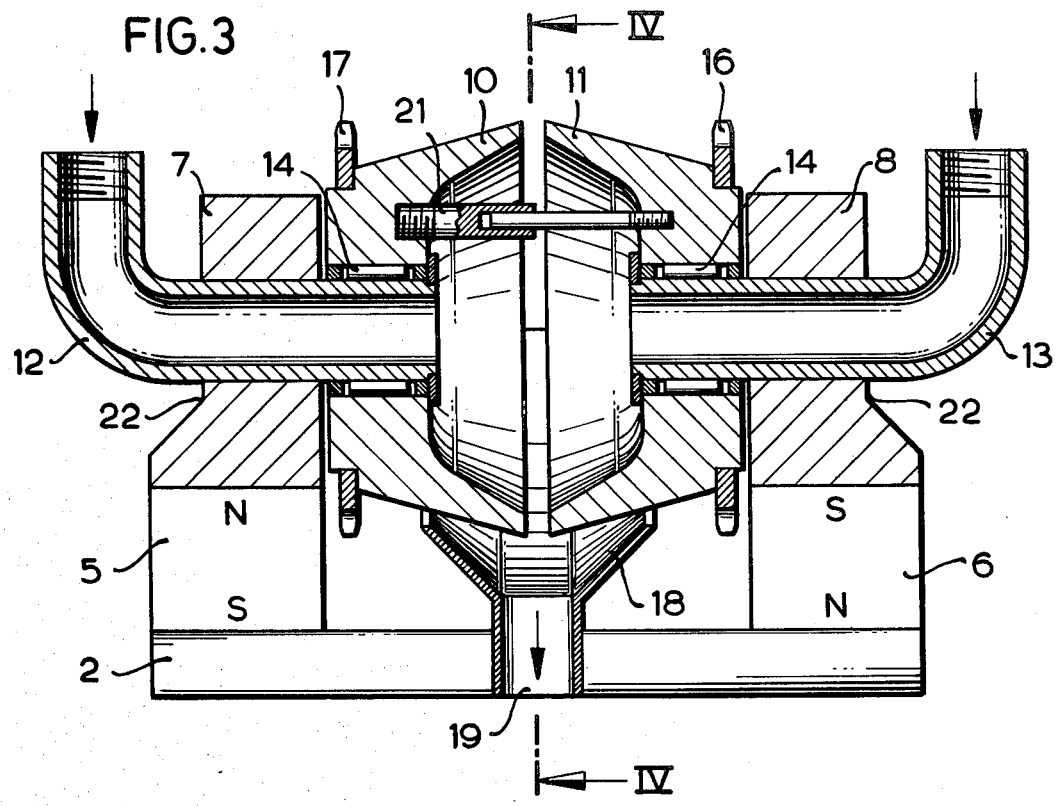
FIG. 3 is a vertical section through the separator along line III—III of FIG. 1, looking in the direction of the arrows.

In another modification or embodiment, as indicated by dots and dashes in FIG. 3, the rotary bodies 10, 11 are interconnected in their interior by a screw connection 21, or by a similar connection, and each of said rotary bodies is positioned on only one of the tubes 12, 13. In such case, the propulsion or rotation of the rotary bodies 10, 11 is effected through only one of said rotary bodies so that, then, only one gear-like member or serrated crown and only one drive is required.

The foregoing described modified constructions do not affect the essential mode of operation in any adverse manner nor the improved effectiveness obtained according to the present invention.

Referring again to the embodiment of FIG. 1 and specifically also to FIG. 3, it will be noted that above the adherence ranges of the permanent magnets 3, 4, 5, 6, the pole shoes 7, 8 have a tapering of the cross-section near part 22. This serves to more strongly concentrate the magnetic lines of force in their radiation range opposite the rotary bodies 10, 11.

Figure 5:
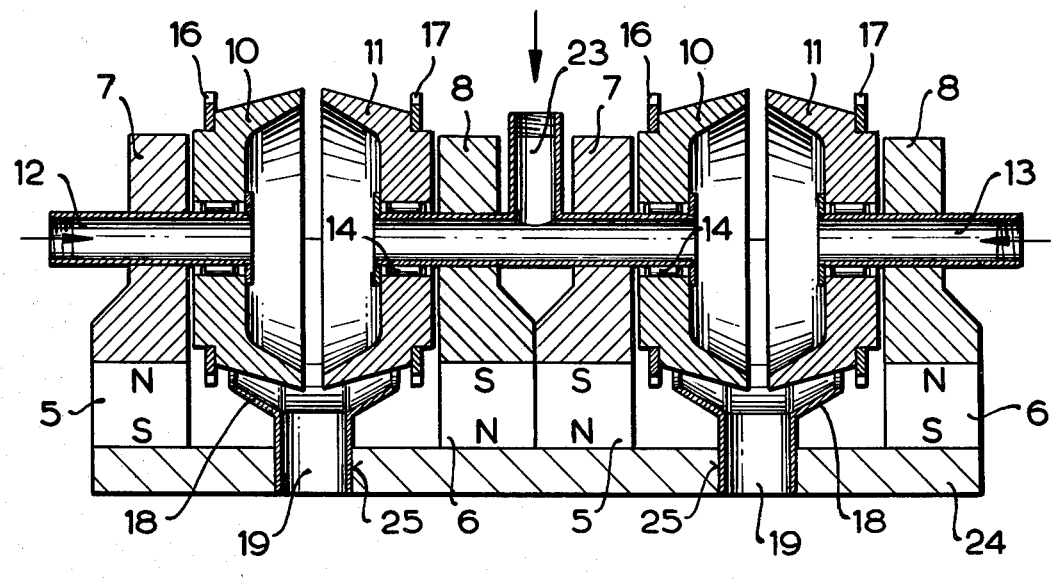
FIG. 5 is a vertical sectional view showing two juxtaposed separators.

It is also within the scope and teachings of the present invention to combine a plurality of catch and discharge bodies and a plurality of magnetic yokes to one magnetic separator. FIG. 5 shows such a construction which is achieved by the juxtaposition of two catch and discharge bodies with magnetic yokes based on the above-described embodiment of FIG. 3. As shown in FIG. 5, the two sets of rotary bodies 10, 11 have disposed generally centrally thereof a joint feeder tube 23 for the liquid to be separated. The lateral feeder tubes 12, 13 are maintained in an unchanged arrangement. Further, in the embodiment of FIG. 5, in place of bars 1, 2, which, as mentioned, are used as a magnetic short circuit for the permanent magnets 3, 4, 5, 6, a joint base plate 25 made of ferromagnetic material is used and is provided with apertures 25 through which discharges 19 pass. A base plate 24 also may be provided in the embodiment of the separator according to FIG. 1, said base plate being there shown by dots and dashes.

Figure 6:
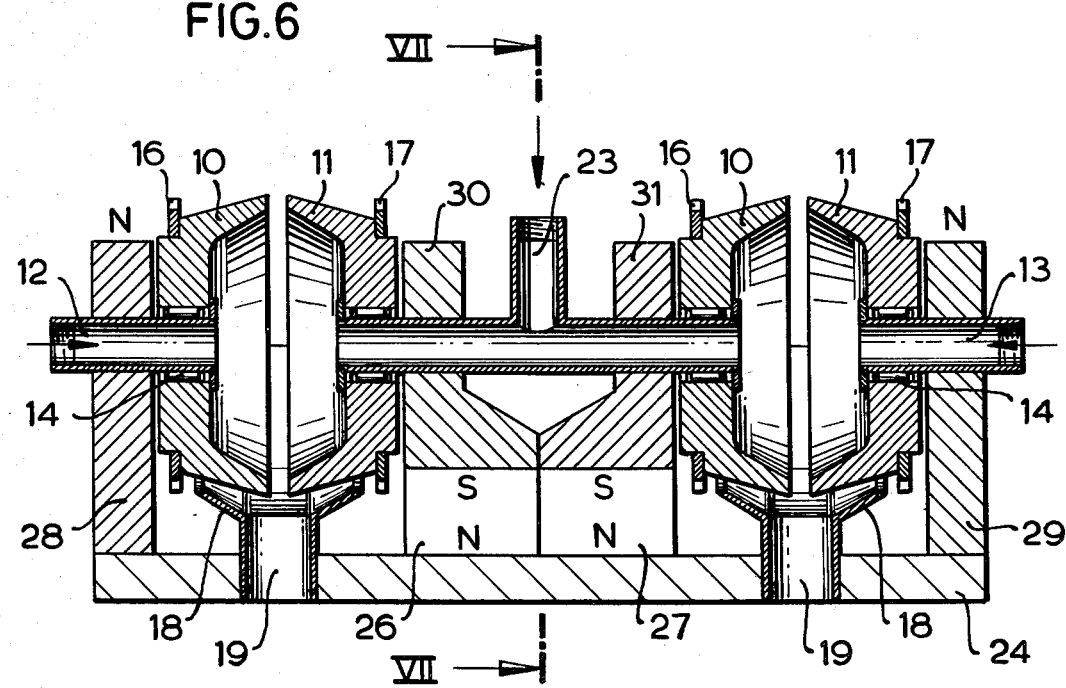
FIG. 6 is a vertical sectional view showing two juxtaposed separators in which the magnets of the FIG. 6 embodiment differ from that shown in the embodiment of FIG. 5.
Figure 7:
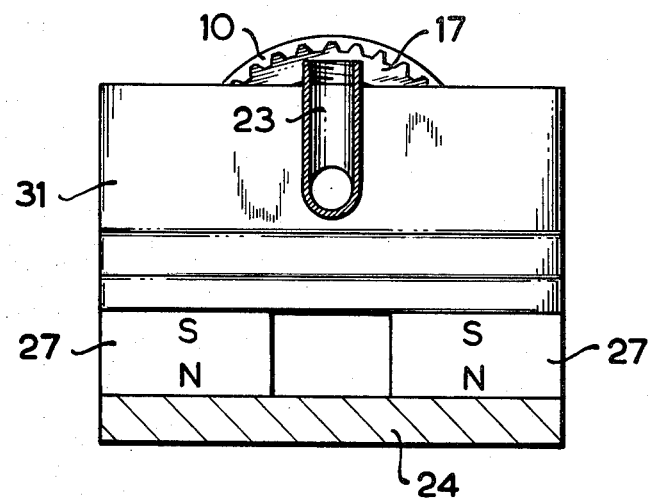
FIG. 7 is a vertical section through the separator along line V—V of FIG. 6, looking in the direction of the arrows.

FIG. 6 discloses another embodiment of the present invention which, like the separator according to FIG. 5, is equipped with two catch and discharge bodies 10, 11, but differs from the FIG. 5 embodiment in that, in the FIG. 6 embodiment, the magnetic yokes in each case are provided with permanent pairs of magnets 26, 27, on only one side. They are arranged in the center of the separator between the rotary bodies 10, 11 with identical poles on a ferro-magnetic base plate 24. Conduit guides 28, 29 of ferro-magnetic material are arranged at the ends of the plate 24 which somewhat protrude with regard to the rotary bodies 10, 11. Pole shoes 30, 31 are provided and, as counter-poles to said pole shoes 30, 31, the conduit guides 28, 29 pass the polarity on with which the poles of the permanent magnets 26, 27 adhere to the base plate 24, to the rotary bodies 10, 11. In this embodiment, the conduit guides 28, 29 take over the function of the external permanent magnets 5, 6 (FIG. 5) which are missing in this embodiment of FIG. 6.

Figure 8:
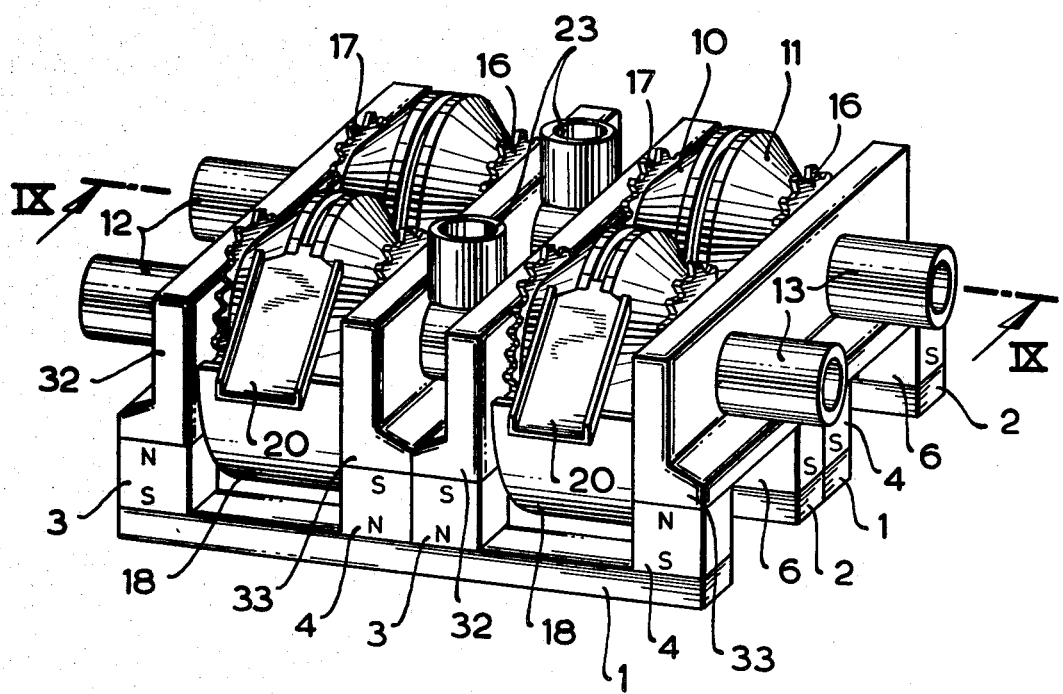
FIG. 8 is a schematic top view of a separator with catch bodies and discharge bodies arranged juxtaposed and back to back.
Figure 9:
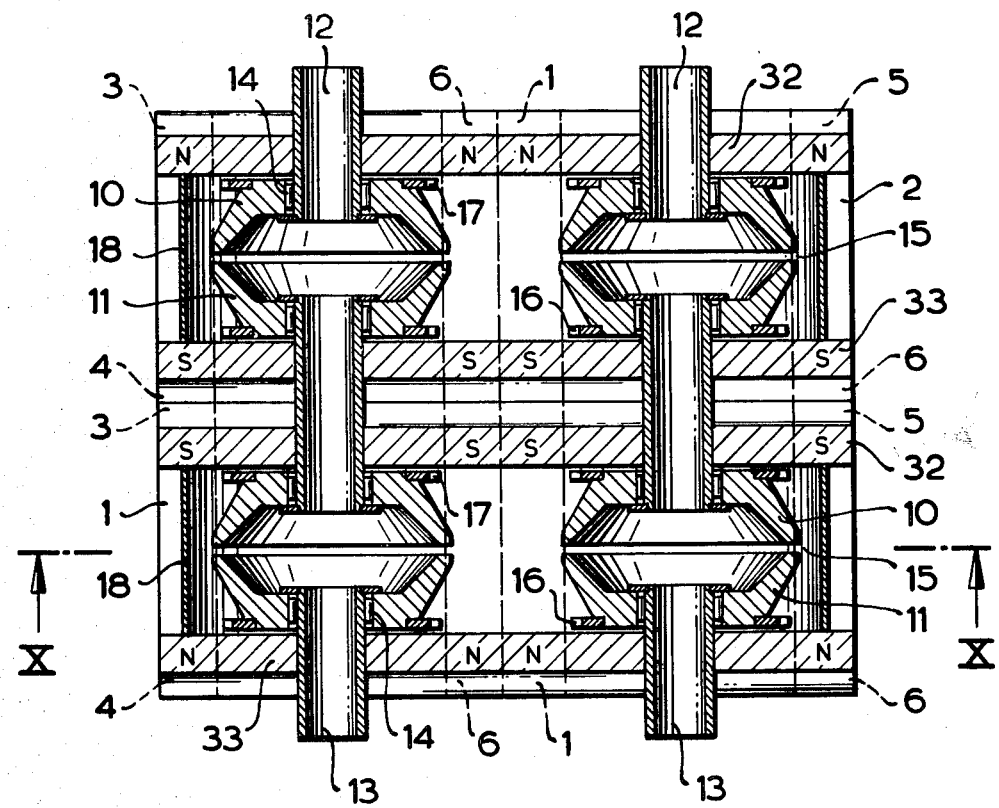
FIG. 9 is a horizontal section through the separator of FIG. 8 taken along line VI—VI of FIG. 8, looking in the direction of the arrows.
Figure 10:
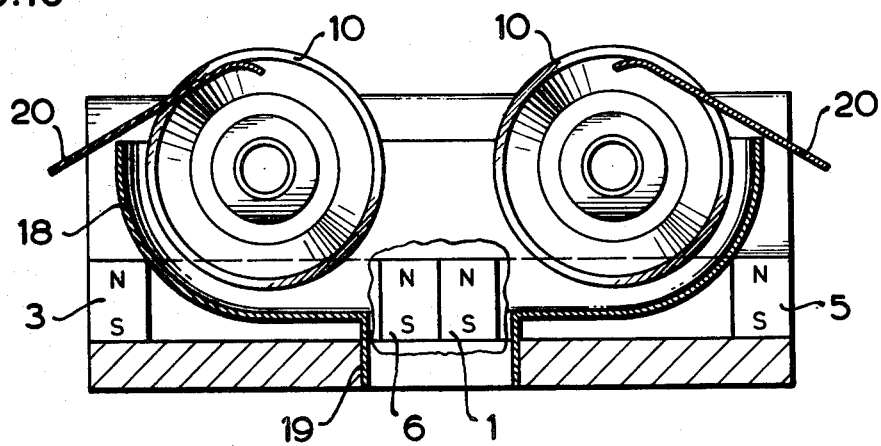
FIG. 10 is a vertical section through the separator of FIG. 8 taken along line VII—VII of FIG. 9.

FIGS. 8, 9 and 10 show a still further embodiment of the present invention in the form of a variant of the embodiments of FIGS. 1 and 5. The embodiment of FIG. 8 represents a separator where four catch and discharge bodies are arranged juxtaposed and back to back, and wherein, according to the basic design of FIG. 1, for each catch and discharge body two magnetic yokes are provided and two joint pole shoes 32, 33 are provided for each pair of catch and discharge bodies placed back to back.

Figure 11:
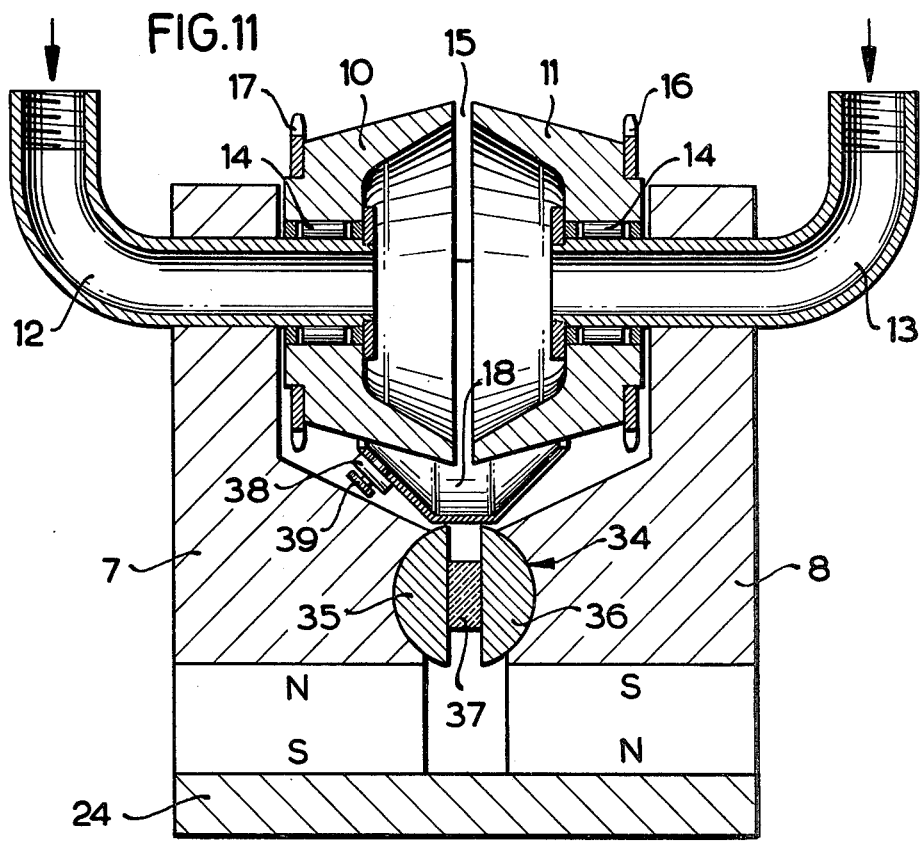
FIG. 11 is a horizontal section through still another embodiment of a separator with a catch and discharge body, whose magnetic yoke is connectable and disconnectable.
Figure 12:
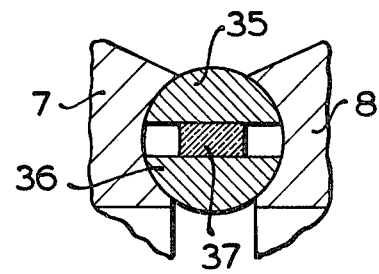
FIG. 12 is a view, partly in section, of the switching body of FIG. 11, but in the disconnected position.

FIGS. 11 and 12 represent still another embodiment of the present invention, which is a modification of that of FIG. 1 but wherein means are provided for disconnecting the magnetism, which is, at times, desirable in order to flush the rotary bodies 10, 11. To that end, a switching body or unit 34 is provided below the container 18. By rotary movement of said switching body the magnetic lines of force located in the pole shoes 7, 8 can be short-circuited. The switching body 34 is of roller-like design and comprises two circular-segment parts 35, 36, as to their cross-section, made of ferromagnetic material and separated by a non ferromagnetic material preferably in the form of a bar-shaped body 37. In the position of the switching body 34 shown in FIG. 11, said body is in its closed position. FIG. 12 shows the switching body 34 turned through 90°, which is the open position in which the parts 35, 36 interconnect the pole shoes 7, 8, and thus effect a magnetic short. The flushing liquid can also be discharged through the container 18 via a separate conduit 38 provided with a blocking slide 39, independently of the discharge 19. Analogously, the magnetic connect and disconnect means shown in FIG. 11 at one separator with one catch and discharge body can, if desired, also be applied to separators with a plurality of catch and discharge bodies.

Figure 13:
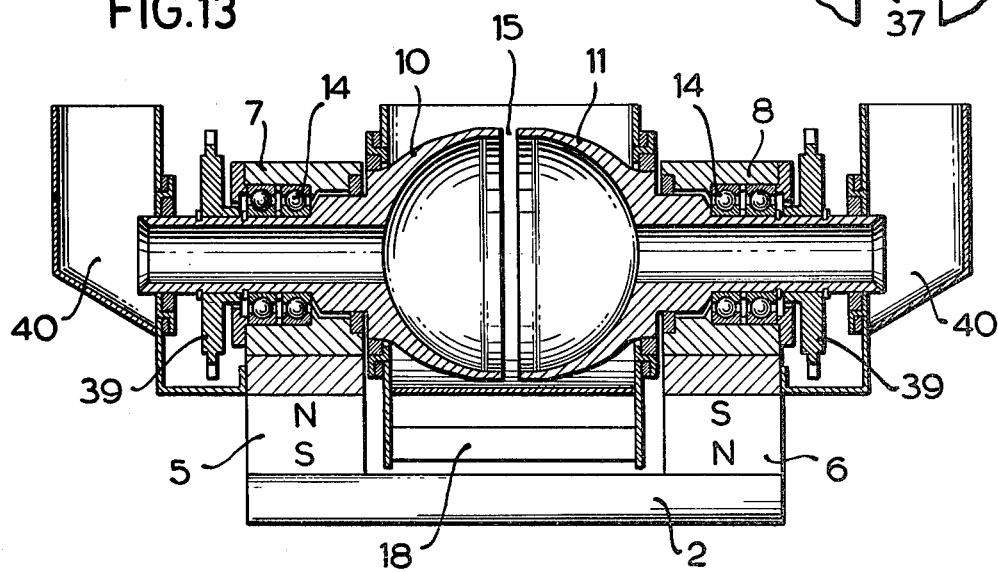
FIG. 13 is a vertical section through another embodiment of a separator where the catch and discharge body forms one piece with the infeed pipe and the drive is placed outside the magnetic yoke.

In FIG. 13 still another embodiment of the present invention is shown in which the drive is positioned outside the magnetic yoke. In this case the rotary bodies 10, 11 form one piece with the tubes for the infeed of the liquid to be purified. The rotary bodies 10, 11 are, as before, positioned in ball bearings 14 within the pole shoes 7, 8. Sprocket wheels 39 are provided for a drive (not shown) for the propulsion or rotation of the rotary bodies 10, 11, and they are placed outside the magnetic yoke ahead of the pole shoes 7, 8 in each case. The liquid to be purified is introduced into the tube-like extensions of the rotary bodies 10, 11 via feed tanks 40.

Other embodiments of the present invention will become apparent in light of the guiding principles and teachings contained herein.

What is claimed is:

1. A permanent magnetic separator for liquids to be purified comprising at least one set consisting of two bowl-shaped bodies each of which bowl-shaped bodies is positioned rotatably on a hollow shaft, said bowl-shaped bodies being arranged opposite each other symmetrically and with an operating air gap therebetween, said hollow shafts serving as inflows for the introduction of the liquid to be purified into the interiors of said bowl-shaped bodies, the outflow of said liquid occurring through said operating gap, a container partially surrounding said bowl-shaped bodies and into which said liquid passes after separation therefrom of the ferromagnetic impurities, permanent magnets positioned outside of said bowl-shaped bodies, separate pole shoes each in contact with their associated permanent magnets, said bowl-shaped bodies being oppositely polarized, said pole shoes carrying said hollow shafts, said ferromagnetic impurities being collected from the liquid to be purified in said operating air gap and on and adjacent to the edges of said bowl-shaped bodies, and a stripper associated with said operating air gap to remove said ferromagnetic impurities during rotation of said bowl-shaped bodies for discharge and removal of said ferromagnetic impurities.

2. A separator according to claim 1, in which there are two strippers, and in which the bowl-shaped bodies are rotated in opposite directions in relation to each other.

3. A separator according to claim 1, in which at least one of the bowl-shaped bodies is provided with a serrated crown through which such bowl-shaped body is rotated.

4. A separator according to claim 3, in which only one of said bowl-shaped bodies is directly rotated, and the other of said bowl-shaped bodies is connected to said directly rotated bowl-shaped body.

5. A separator according to claim 1, wherein each of said bowl-shaped bodies is connected to its said hollow shaft to form one-piece units therewith, and wherein said bowl-shaped bodies are connected to drive means outside of the pole shoes.

6. A separator according to claim 1, in which there are, for each of said bowl-shaped bodies, two pole shoes and two magnetic yokes.

7. A separator according to claim 6, in which a ferromagnetic base plate is provided to which said two magnetic yokes are common.

8. A separator according to claim 6, in which the two bowl-shaped bodies are each placed in pairs and there is disposed between them a joint feed tube for the liquid to be purified.

9. A separator according to claim 6, in which said bowl-shaped bodies are juxtaposed in pairs, and the permanent magnets are arranged between the bowl-shaped bodies, and including external conduit guides and a base plate and wherein said external conduit guides are directly connected to said base plate.

10. A separator according to claim 6, in which at least one of said magnetic yokes is provided with a switching unit for effecting shorting of the magnetic lines of force.

11. A separator according to claim 10, in which the switching unit is roller-like in construction and consists of two parts which are circular segment-like in cross-section and are made from ferromagnetic material and which are separated by a generally bar-like non-ferromagnetic body.

12. A separator according to claim 1, in which there are two sets of said two bowl-shaped bodies which sets are arranged back to back, and whereby, for each set of said bodies, two magnetic yokes are provided, and, additionally, two joint pole shoes are provided for each set of said bowl-shaped bodies placed back to back.

13. A separator according to claim 11, in which a ferromagnetic base plate is provided to which said two magnetic yokes are common.

14. A separator according to claim 12, in which, of the sets of bowl-shaped bodies, there is disposed between said sets a joint feed tube for the liquid to be purified.

15. A separator according to claim 12, in which, of the sets of bowl-shaped bodies, the permanent magnets are arranged between the bowl-shaped bodies, and including external conduit guides and a base plate and wherein said external conduit guides are directly connected to said base plate.

16. A separator according to claim 1, in which there is a plurality of magnetic yokes, and in which a ferromagnetic base plate is provided, said magnetic yokes being common to said ferromagnetic base plate.

17. A separator according to claim 1, which includes a switching unit for effecting shorting of the magnetic lines of force in the pole shoes.

18. A separator according to claim 15, in which the switching unit is roller-like in construction and consists of two parts which are circular segment-like in cross-section and are made from ferromagnetic material and which are separated by a generally bar-like non-ferromagnetic body.

* * * * *